United States Patent
Allgayer et al.

(10) Patent No.: US 7,140,656 B2
(45) Date of Patent: Nov. 28, 2006

(54) MOTOR VEHICLE WITH PARTITION

(75) Inventors: Holger Allgayer, Ostfildern (DE); Holger Schleife, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/252,581

(22) Filed: Oct. 19, 2005

(65) Prior Publication Data
US 2006/0082177 A1   Apr. 20, 2006

(30) Foreign Application Priority Data
Oct. 20, 2004   (DE) .................... 10 2004 051 015

(51) Int. Cl.
*B60N 3/00* (2006.01)
(52) U.S. Cl. .................... 296/24.43; 296/24.4
(58) Field of Classification Search ............... 296/24.4, 296/24.41, 24.42, 24.43, 24.44, 24.45, 24.46
See application file for complete search history.

(56) References Cited
U.S. PATENT DOCUMENTS 3,002,784 A * 10/1961 Bagg .......................... 296/85
4,971,378 A * 11/1990 Setina ..................... 296/24.46
6,474,713 B1 * 11/2002 Ruck et al. ............... 296/24.43

FOREIGN PATENT DOCUMENTS

DE   19751671 A1   6/1999
DE   10322611      8/2004

OTHER PUBLICATIONS

German Office Action dated Nov. 22, 2005 with partial English translation.

* cited by examiner

*Primary Examiner*—Joseph D. Pape
(74) *Attorney, Agent, or Firm*—Crowell & Moring LLP

(57) ABSTRACT

A motor vehicle has a loading compartment and a driver's compartment which is separated from the loading compartment via a partition. In order to permit great variability by making good use of the space, the partition is of two-part design, with the two parts being connected to each other via a hinge. The hinge makes it possible for the second part to be able to be pivoted in relation to the fixed, lower part toward the loading compartment or toward the driver's compartment. A latching device secures the partition in various pivoting angles.

20 Claims, 3 Drawing Sheets

MOTOR VEHICLE WITH PARTITION

This application claims the priority of German application 10 2004 051 015.6, filed Oct. 20, 2004, the disclosure of which is expressly incorporated by reference herein.

BACKGROUND AND SUMMARY OF THE INVENTION

This invention relates to a motor vehicle with a closed loading compartment and a driver's compartment which is separated from the loading compartment via a partition, which has an adjustable vehicle seat, in which the partition includes at least first and second surfaces which are connected pivotably to each other, and in which a hinge runs parallel to a vehicle floor and pivotally connects the surfaces to each other.

German document DE 19751671 A1 discloses a partition for minibuses or trucksters. The partition runs transversely with respect to the longitudinal direction of the vehicle and separates a driver's compartment from a useable space. In order to enlarge the useable space available, this partition is designed in such a manner that it has an upper section and a lower section, the lower section extending into the driver's compartment under the seats thereof. As a result, an additional useable space is provided at the expense of the driver's compartment.

One object of the present invention is the object of providing a vehicle which provides great loading compartment and driver's compartment variability by making good use of the space and at the same time which has a high degree of safety.

This object is achieved according to the invention by a motor vehicle having a latching device arranged in a region of a vehicle roof, with the first surface arranged in a lower region of the vehicle and connected fixedly both to the vehicle floor and also, on both sides, to vehicle walls, and with the second surface arranged in an upper region of the vehicle and secured fixedly in an adjustable manner in various pivoting angles via the hinge.

The partition of the motor vehicle according to the invention has two surfaces which are connected to each other via a hinge running transversely with respect to the vehicle floor. A first surface is arranged in the lower region of the vehicle and is connected fixedly both to the vehicle floor and also, on both sides, to the vehicle wall. As a result, this surface forms a stable termination of the loading compartment and increases the strength of the vehicle structure. The second surface of the partition is arranged in the upper region of the vehicle and can be pivoted by means of the hinge. The second surface is secured fixedly in various pivoting angles via a latching device arranged in the region of the vehicle roof.

The pivoting of the upper part of the partition therefore enables either the driver's compartment to be enlarged, by the partition being pivoted in the direction of the loading compartment, or it enables the loading compartment to be enlarged by the partition being pivoted in the direction of the driver's compartment. As a result, it is possible for even very large drivers, with a predetermined size of the driver's compartment, to be able to push the vehicle seat back a long way or to be able to incline the backrest rearward a long way in order to take up a comfortable and ergonomic sitting position. For this purpose, the partition is pivoted toward the loading compartment, so that the necessary space is created for the driver.

In the case of smaller drivers or in the case of very large freight items, the partition can be pivoted forward toward the driver's compartment, so that an enlarged loading compartment is obtained. A stable connection of the upper, second surface of the partition to the vehicle body is produced via the fixed, lower segment of the partition and the hinge. A latching device is provided at the upper end of the second surface and connects the latter fixedly to the vehicle roof. As a result, the necessary safety is ensured even in the event of a crash by items of luggage being securely retained in the loading compartment by the partition during sharp braking maneuvers or a crash.

In one embodiment, provision is made for the latching device to have two intermeshing racks. The first rack is connected fixedly to the vehicle body, preferably the structure of the vehicle roof. The second rack is connected in an articulated manner to the second surface of the partition. The two racks engage in one another and therefore define a certain set angle of the second surface. The articulated suspension of the second rack makes it possible for a relatively large angular region to be able to be covered while the two racks remain constantly stably connected.

In particular, provision can be made for the latching device to have a prestressed spring which pressurizes the second rack in the direction of the first rack. As a result, the mechanical connection of the two racks is further improved and the retaining force of the latching device is increased.

One embodiment makes provision for the setting of the teeth of the two racks to be designed in such a manner that a movement of the second rack forward in the direction of travel is blocked and a movement of the second rack rearward counter to the direction of travel is made possible in the event of it being pressed over the latching. As a result, a simple possibility of adjusting the upper partition section in the direction of the loading compartment is obtained and at the same time a particularly good support of the partition is obtained should items of luggage impact against the partition in the direction of the driver's compartment.

For a particularly stable support, provision may be made for a plurality of latching devices or pairs of racks to be arranged next to one another on the second surface of the partition.

A roof lining which covers the latching device can be arranged below the vehicle roof. The latching device is therefore fitted in a visually advantageous manner between the roof lining and vehicle roof and cannot be seen from the driver's compartment.

In order to permit an ergonomically favorable possibility of adjusting the vehicle seat, provision may be made for the hinge to be arranged at such a height above the vehicle floor that the resulting pivot point of the second surface is arranged approximately at the same height as the pivot point of a pivotable backrest of the driver's seat. The effect achieved by this solution is that the second surface of the partition can be pivoted parallel to a backrest of a driver's seat.

In order to achieve good stability at low weight, provision is made for the second surface to have a mechanically stiff frame of profiled material which encircles the second surface in a closed manner and in which an extensive filling composed of a mechanically stiff material is accommodated. This filling may be formed from sheet metal or a fiber composite material. Furthermore, in order to increase the rigidity, the filling has a curvature directed toward the loading compartment or a profiling.

The invention can be used in particular for lightweight commercial vehicles, such as van-type trucks or vans. However, it may also be used for motor homes or coaches in order firstly to provide a comfortable driver's compartment or interior and secondly to provide as large a loading compartment as possible by making correspondingly good use of the space.

Further features of the invention are illustrated in the drawings and described in more detail below in the associated description.

DETAILED DESCRIPTION OF THE INVENTION

Figure 1:
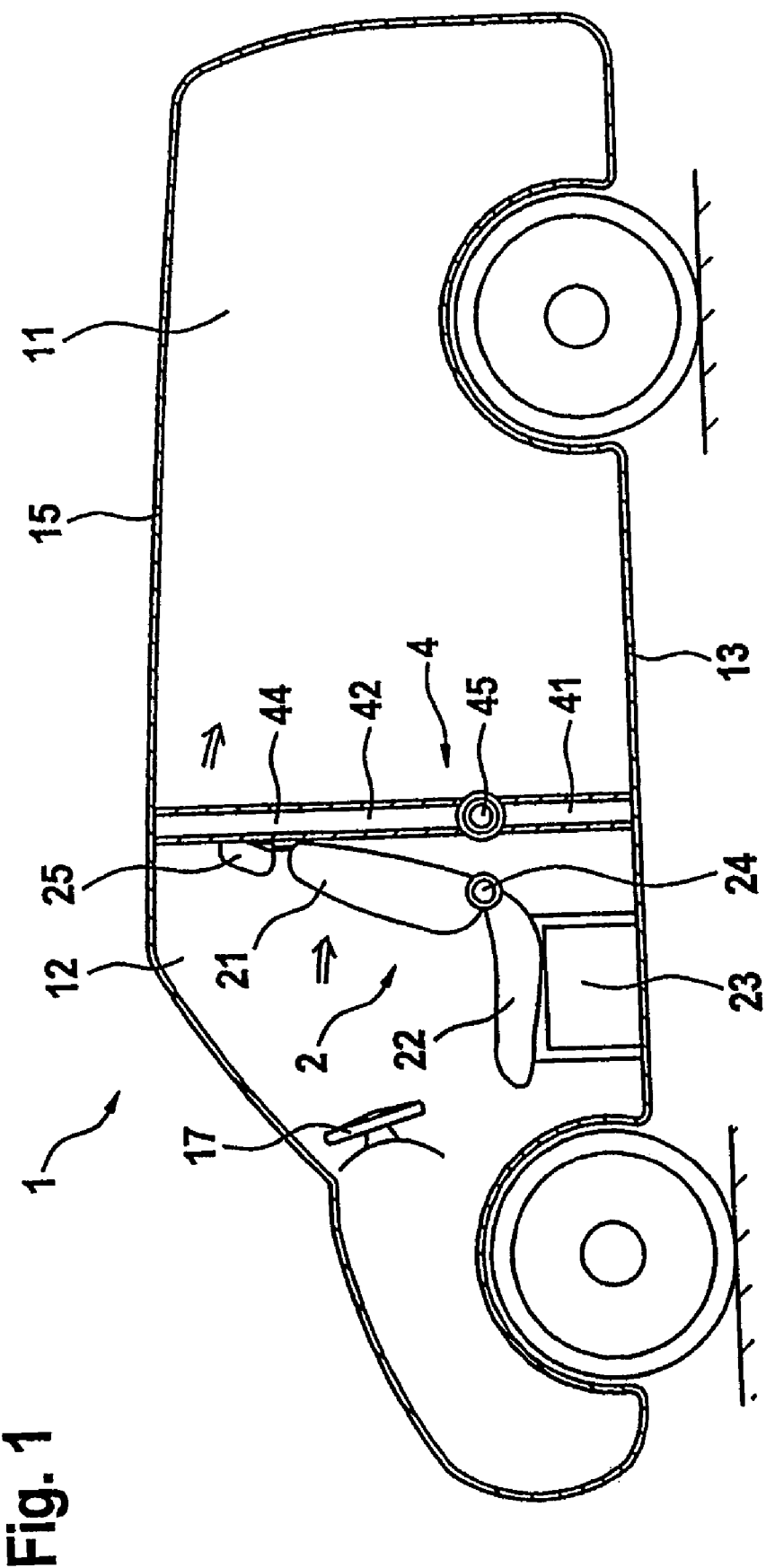
FIG. 1 shows a longitudinal section through a motor vehicle with a partition according to the invention.

FIG. 1 illustrates a motor vehicle 1 with a loading compartment 11 and a driver's compartment 12. The loading compartment 11 is terminated downward by a motor vehicle floor 13 and upward by a motor vehicle roof 15 and laterally by side walls 14. A vehicle seat 2 is arranged in the driver's compartment 12 which is arranged in front of the loading compartment in the direction of travel, said vehicle seat 2 having a seat cushion 22 and a backrest 21 connected pivotably to the latter via a rotary fitting 24. A height-adjustable head restraint 25 is arranged at the upper end of the back rest 21. The vehicle seat 2 is connected to the motor vehicle floor 13 via a seat box 23 and can be displaced on the seat box 23 in the longitudinal direction of the vehicle, that is to say forward or rearward, via guide rails in order to set a desired sitting position. Furthermore, the backrest 21 can be adjusted in inclination via the rotary fitting 24, so that a driver can set the sitting position which is optimum for him.

An instrument panel 18 and a steering wheel 17 are arranged in front of the driver's seat 2 in the direction of travel in order to clarify the cockpit.

Figure 2:
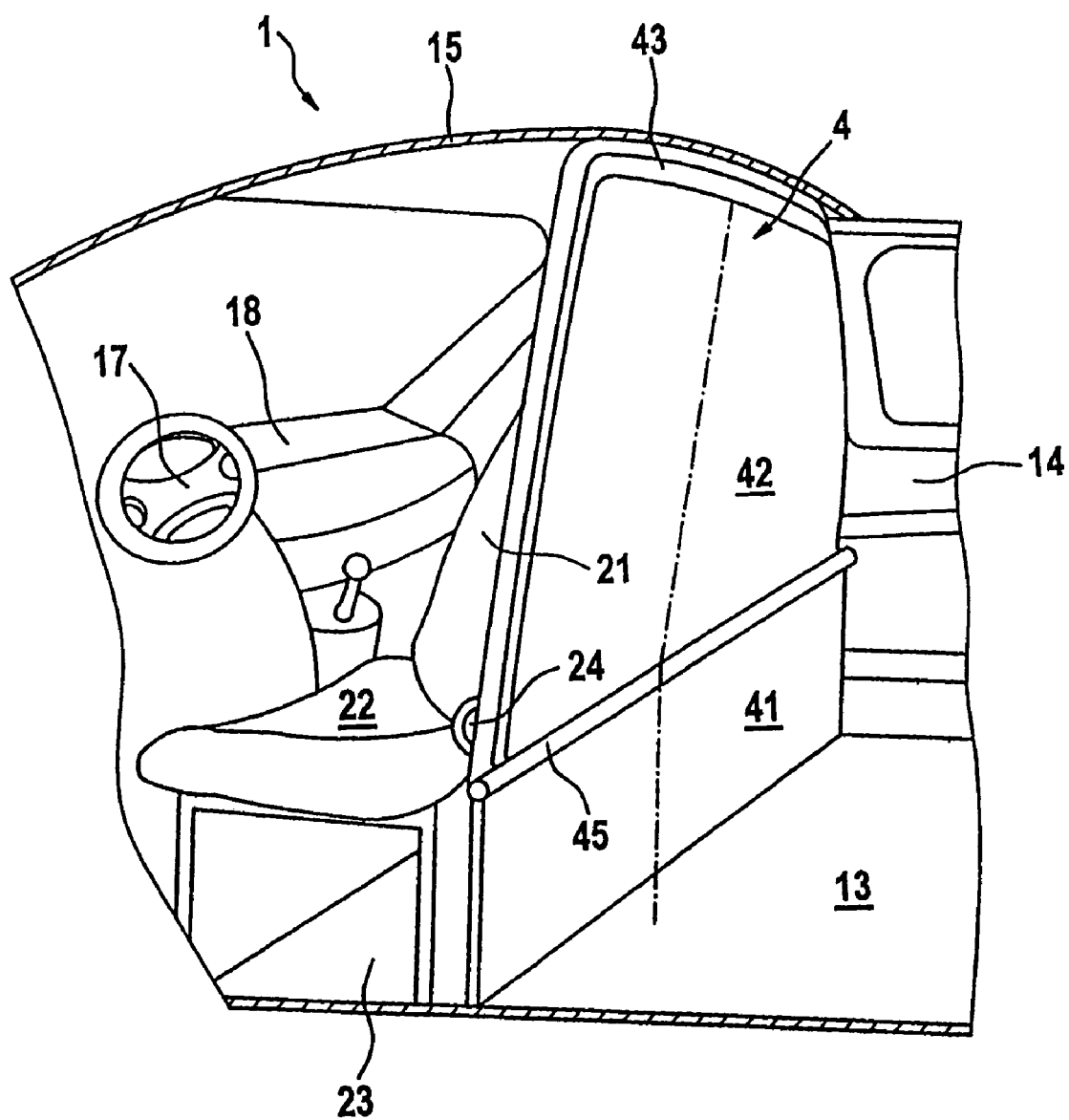
FIG. 2 shows a perspective plan view of a partition designed according to the invention.

Situated between the driver's compartment 12 and the loading compartment 11 is a partition 4 which separates the driver's compartment 12 and the loading compartment 11 from each other, as is also illustrated in FIG. 2. The partition 4 has a first surface 41 and a second surface 42. The two surfaces 41, 42 are connected pivotably to each other via a hinge 45 running transversely with respect to the vehicle floor 13. The first surface 41 is arranged in the lower region of the partition 4, close to the vehicle floor 13, and is connected fixedly, in particular, is welded, adhesively bonded or riveted, both to the vehicle floor 13 and to the two side walls 14. The second surface 42, which is arranged above the first surface 41, runs from the hinge 45 upward as far as the vehicle roof 15. The second surface is mounted pivotably at its lower end via the hinge 45 on the lower part of the partition 41 and at its upper end has a latching device 3 which connects the second surface 42 fixedly to the vehicle roof.

It is made clear in FIG. 2, via the dashed central line of the partition 4, that the upper part 42 is pivoted rearward in relation to the vertically running, lower part 41 into the loading compartment. In order to reinforce the stability, the upper part 42 of the partition 4 has an encircling frame 43 which is formed from a profiled frame, in particular an aluminum profiled frame or a steel profiled frame. The profiled frame 43 has a filling 44 which can consist, for example, of aluminum sheet or steel sheet or of a synthetic fiber composite material. In addition, transparent surfaces may be provided in the filling, permitting a view from the driver's compartment into the loading compartment. As a result, the driver can check the items of luggage in the loading compartment even during the journey.

Figure 3:
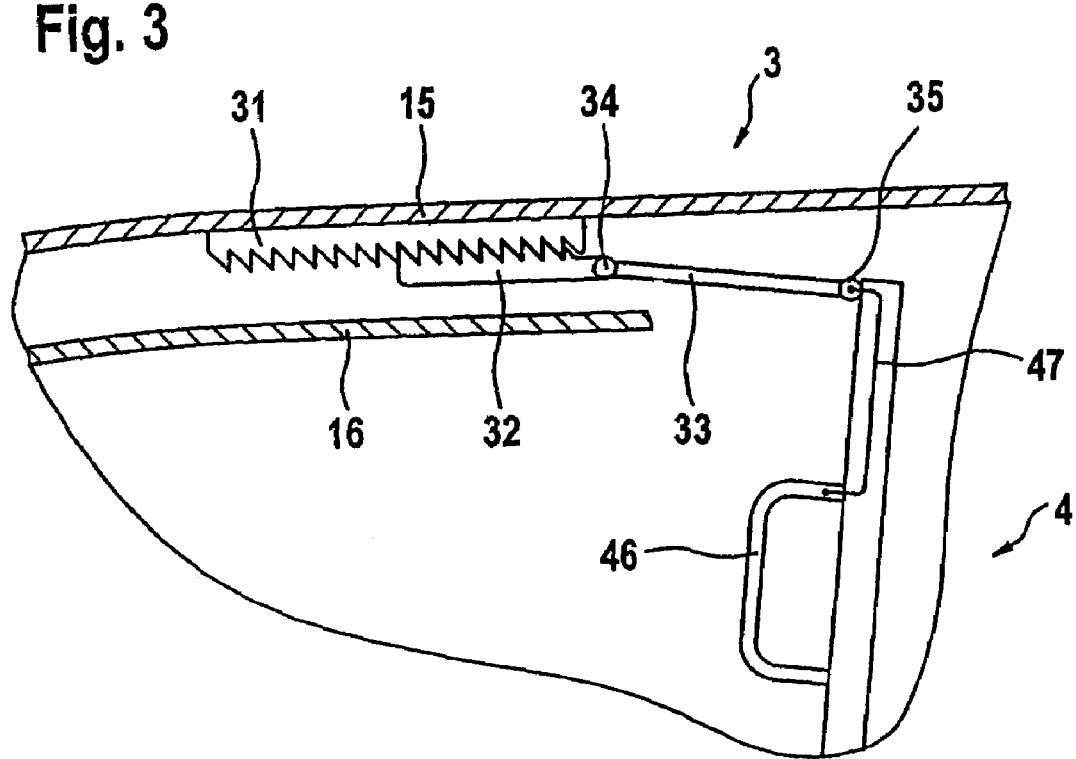
FIG. 3 shows a longitudinal section through a latching device, with the partition illustrated pivoted toward the loading compartment.
Figure 4:
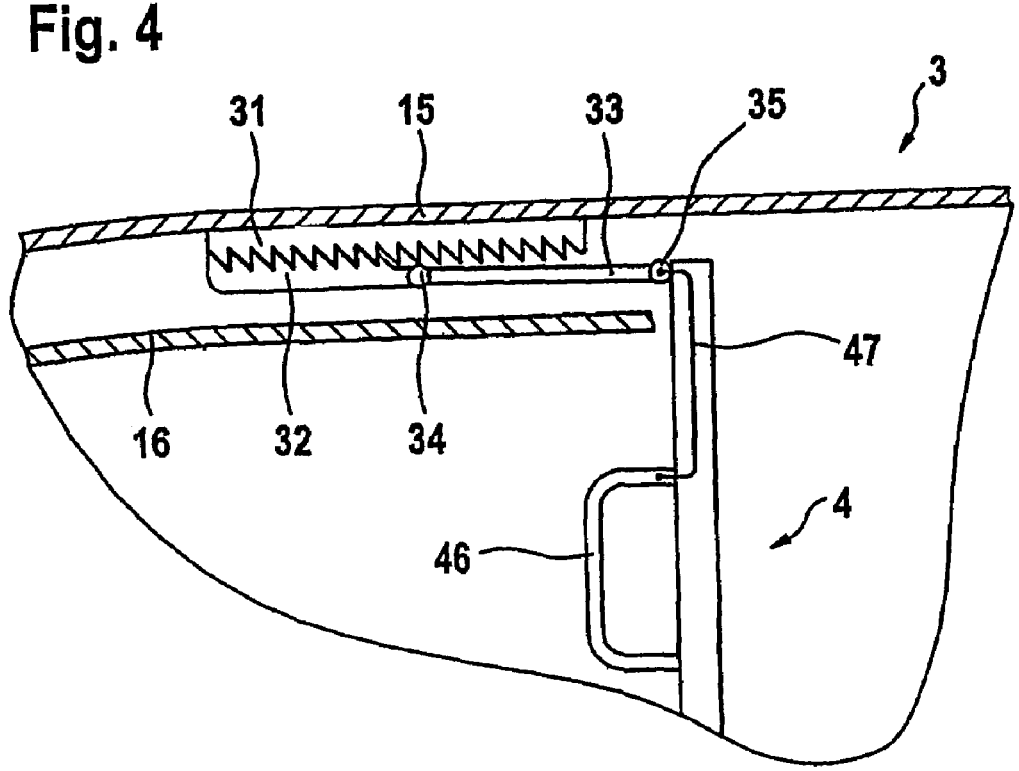
FIG. 4 shows the latching device with the partition illustrated pivoted toward the driver's compartment.

FIGS. 3 and 4 provide enlarged illustrations of the upper region between the partition 4 and the vehicle roof 15. The latching device 3 in particular can be seen in detail there. The latching device 3 has a first rack 31 and a second rack 32, the first rack 31 being connected fixedly to the vehicle roof 15 and the second rack 32 being mounted in an articulated manner on the partition 4. The second rack 32 is arranged below the first rack 31 and meshing therewith. FIG. 3 shows the latching device in a position in which it is pivoted rearward toward the loading compartment 11 while FIG. 4 shows the latching device 3 in a position pivoted toward the driver's compartment.

The latching device 3 is arranged above the driver's compartment 12 in the region of the vehicle roof 15 and is covered by a roof lining 16 extending below the vehicle roof 15, so that the latching device 3 cannot be seen from the driver's compartment. The lower rack 32 is connected to an articulated arm 33 via a first rotary joint 34. The articulated arm 33 is coupled at its other end to the upper end of the partition 4 via a spring joint 35. The spring joint 35 has a spring which pressurizes the second rack 32 toward the first rack 31 in order to improve the connection of the two racks with each other. The toothing of the two racks is designed in such a manner that the racks 31 and 32 are set counter to a movement in the direction of travel, with the result that the partition 4 cannot move forward in the direction of travel but rather only a movement of the partition 4 counter to the direction of travel, i.e. toward the loading compartment 11, is permitted.

A handle 46 fitted fixedly on the partition 4 permits easy operation or pivoting of the partition 4 about the pivot axis formed by the hinge 45. The partition 4 can be pivoted via the handle 46 into the loading compartment simply by pressing it toward the loading compartment. As an alternative, the pivoting of the partition 4 toward the loading compartment may also take place by adjustment of the backrest 21 by the backrest during the pivoting to the rear coming into contact with the partition 4 and pivoting the latter rearward toward the loading compartment.

In order to pivot the loading-compartment partition 4 forward in the direction of travel, it is necessary to actuate the handle 46. The handle is connected to the rotary joints 34 and 35 via a Bowden cable 47. By actuation of the handle, the latter acts on the rotary joints via the Bowden cable and releases the connection of the two racks 31, 32. Therefore, when the handle is actuated, the second rack 32 is disengaged from the first rack 31. Via the actuation of the handle 46, the latching device 3 is released and it is made possible for the driver to pivot the partition 4 in a simple manner forward in the direction of travel toward the driver's compartment.

FIG. 4 illustrates the latching device 3 with the partition 4 being illustrated in a position in which it is situated at the front in the direction of travel, i.e. with the maximum possible loading-compartment volume.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

We claim:

1. A motor vehicle with a closed loading compartment and a driver's compartment which is separated from the loading compartment via a partition and which has an adjustable vehicle seat, the partition comprising:
   at least first and second surfaces which are connected pivotably to each other,
   a hinge running parallel to a vehicle floor by which the surfaces are pivotally connected to each other, and
   a latching device arranged in a region of a vehicle roof,
   wherein the first surface is arranged in a lower region of the vehicle and is connected fixedly both to the vehicle floor and also, on both sides, to vehicle walls, and
   wherein the second surface is arranged in an upper region of the vehicle and is secured fixedly in an adjustable manner by the latching device in various pivoting angles.

2. The motor vehicle as claimed in claim 1, wherein the latching device has first and second intermeshing racks, the first rack being connected fixedly to the vehicle roof and the second rack being connected in an articulated manner to the second surface of the partition.

3. The motor vehicle as claimed in claim 2, wherein the latching device has a prestressed spring which pressurizes the second rack in the direction of the first rack.

4. The motor vehicle as claimed in claim 2, wherein the racks are settable so as to block a movement of the second rack forward in the direction of travel and permit a movement rearward counter to the direction of travel.

5. The motor vehicle as claimed in claim 1, wherein a roof lining is arranged below the vehicle roof and the latching device is arranged between the roof lining and the vehicle roof.

6. The motor vehicle as claimed in claim 1, wherein the hinge is arranged at such a height above the vehicle floor that a resulting pivot point of the second surface is arranged approximately at the same height as a pivot point of a pivotable backrest of the vehicle seat.

7. The motor vehicle as claimed in claim 1, wherein the second surface has a mechanically stiff frame which encircles the second surface and secures a filling composed of mechanically stiff material.

8. The motor vehicle as claimed in claim 7, wherein the filling is formed from sheet metal or fiber composite material.

9. The motor vehicle as claimed in claim 7, wherein the filling has a curvature directed toward the loading compartment or profiling for increasing rigidity.

10. The motor vehicle as claimed in claim 3, wherein the racks are settable so as to block a movement of the second rack forward in the direction of travel and permit a movement rearward counter to the direction of travel.

11. The motor vehicle as claimed in claim 2, wherein a roof lining is arranged below the vehicle roof and the latching device is arranged between the roof lining and the vehicle roof.

12. The motor vehicle as claimed in claim 3, wherein a roof lining is arranged below the vehicle roof and the latching device is arranged between the roof lining and the vehicle roof.

13. The motor vehicle as claimed in claim 4, wherein a roof lining is arranged below the vehicle roof and the latching device is arranged between the roof lining and the vehicle roof.

14. The motor vehicle as claimed in claim 2, wherein the hinge is arranged at such a height above the vehicle floor that a resulting pivot point of the second surface is arranged approximately at the same height as a pivot point of a pivotable backrest of the vehicle seat.

15. The motor vehicle as claimed in claim 3, wherein the hinge is arranged at such a height above the vehicle floor that a resulting pivot point of the second surface is arranged approximately at the same height as a pivot point of a pivotable backrest of the vehicle seat.

16. The motor vehicle as claimed in claim 4, wherein the hinge is arranged at such a height above the vehicle floor that a resulting pivot point of the second surface is arranged approximately at the same height as a pivot point of a pivotable backrest of the vehicle seat.

17. The motor vehicle as claimed in claim 2, wherein the second surface has a mechanically stiff frame which encircles the second surface and secures a filling composed of mechanically stiff material.

18. The motor vehicle as claimed in claim 3, wherein the second surface has a mechanically stiff frame which encircles the second surface and secures a filling composed of mechanically stiff material.

19. The motor vehicle as claimed in claim 4, wherein the second surface has a mechanically stiff frame which encircles the second surface and secures a filling composed of mechanically stiff material.

20. The motor vehicle as claimed in claim 5, wherein the second surface has a mechanically stiff frame which encircles the second surface and secures a filling composed of mechanically stiff material.

* * * * *